Feb. 9, 1954 E. D. DAHLMAN 2,668,629
MATERIAL HANDLING AND UNLOADING DEVICE FOR VEHICLES
Filed Jan. 2, 1951 3 Sheets-Sheet 1
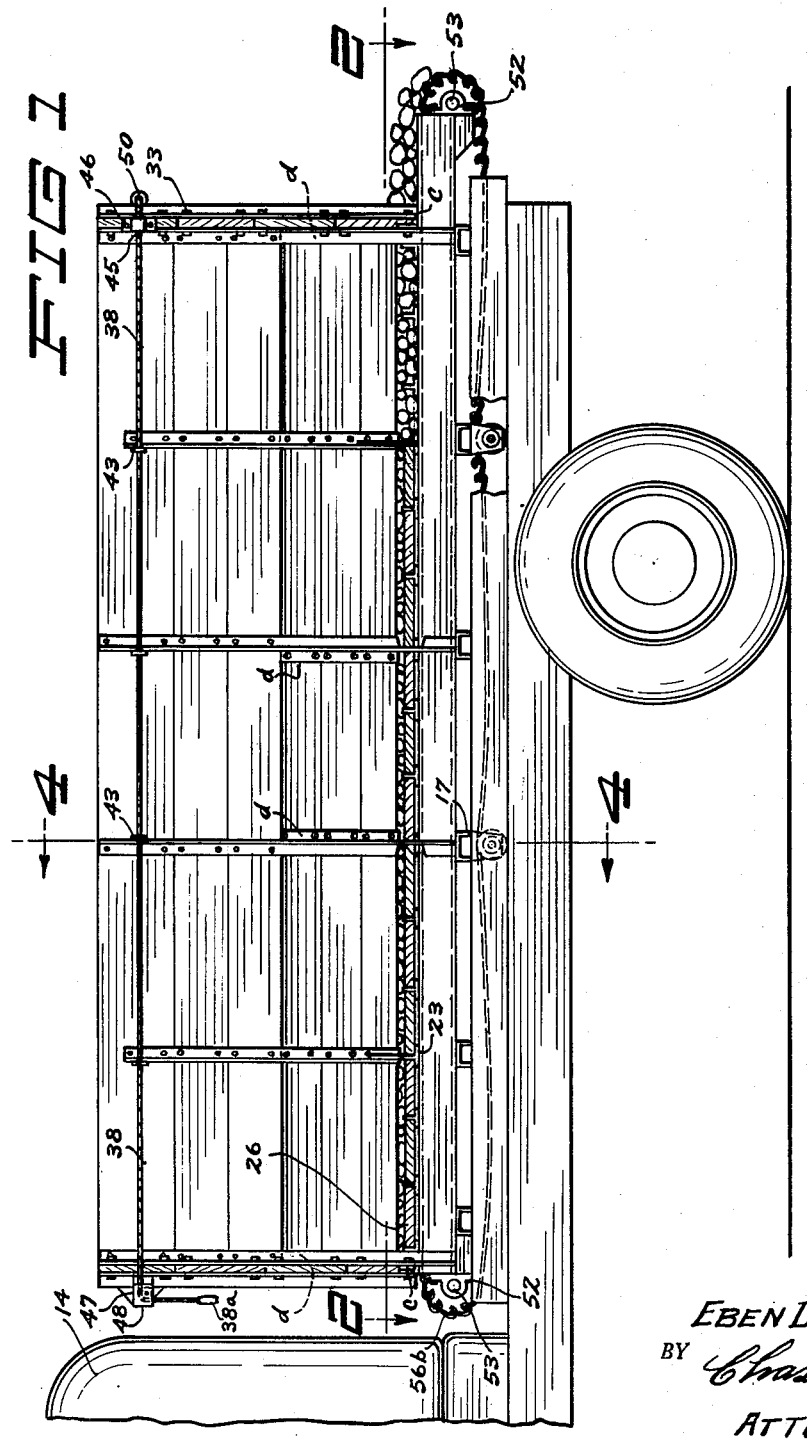
INVENTOR.
EBEN D. DAHLMAN
BY Chas. C. Reyf
ATTORNEY

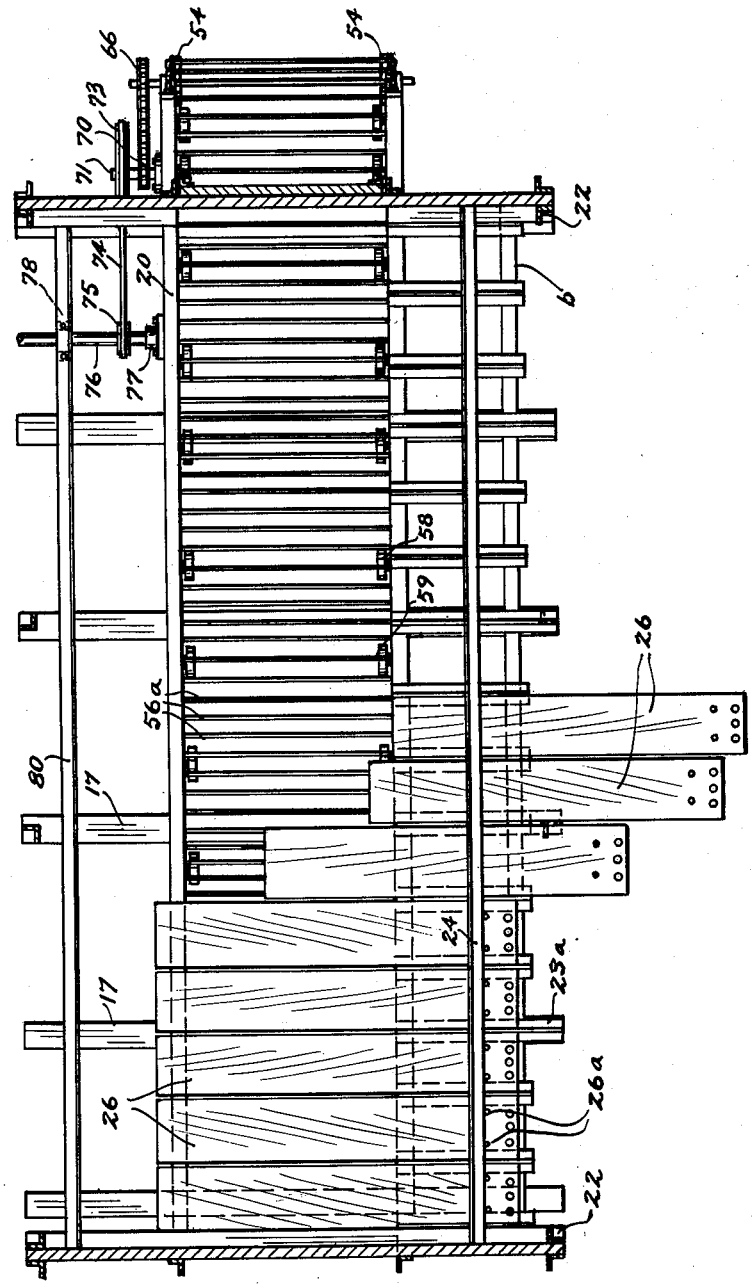

Feb. 9, 1954 E. D. DAHLMAN 2,668,629
MATERIAL HANDLING AND UNLOADING DEVICE FOR VEHICLES
Filed Jan. 2, 1951 3 Sheets-Sheet 3
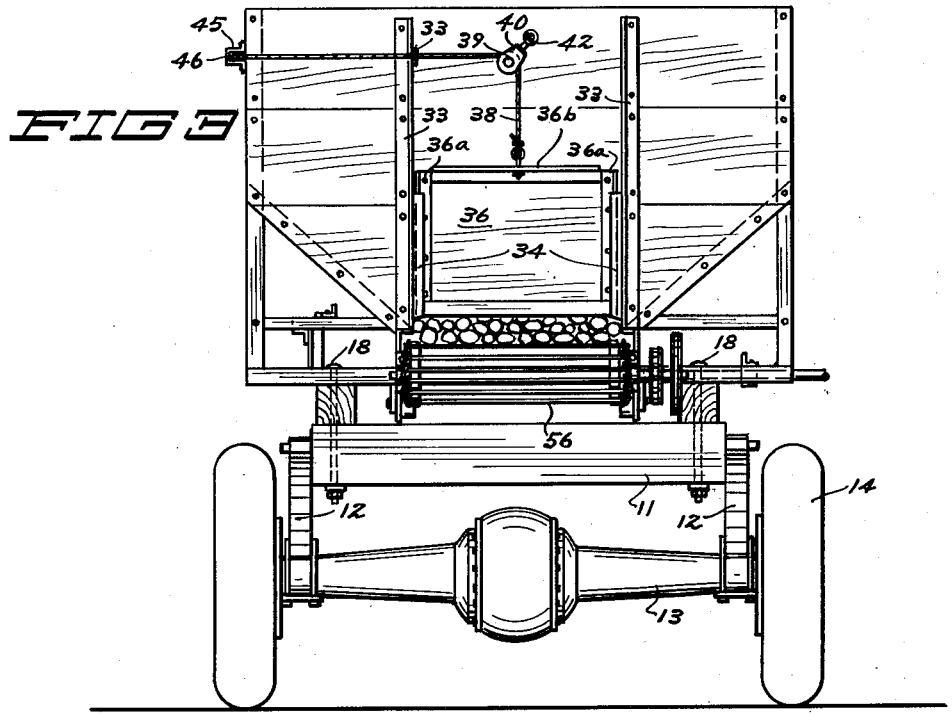
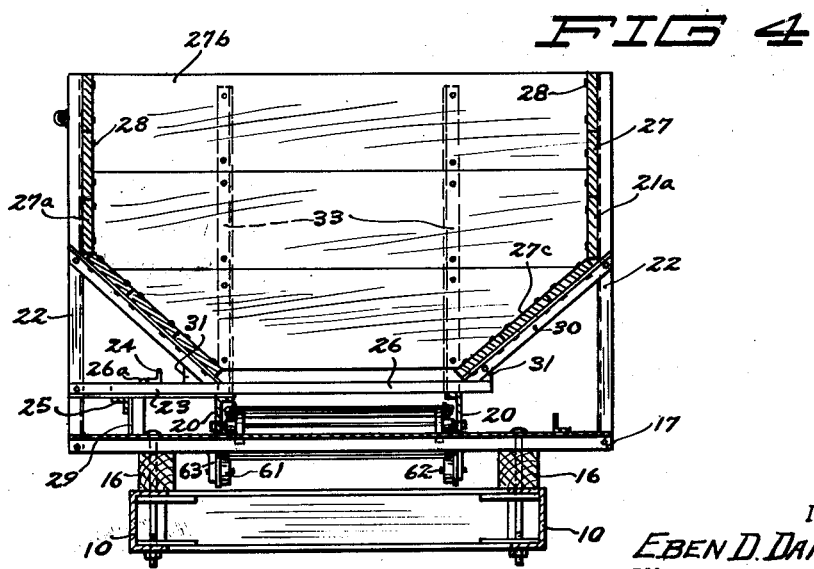
INVENTOR.
EBEN D. DAHLMAN
BY
Chas. E. Reif
ATTORNEY.

Patented Feb. 9, 1954

2,668,629

UNITED STATES PATENT OFFICE 2,668,629

MATERIAL HANDLING AND UNLOADING DEVICE FOR VEHICLES

Eben D. Dahlman, Grandy, Minn.

Application January 2, 1951, Serial No. 203,955

4 Claims. (Cl. 214—83.2)

This invention relates to a potato-handling and transporting device. Potatoes are now harvested by machines and these machines comprise conveyors which elevate the potatoes and have discharge means so that the potatoes can be discharged into vehicles alongside the said machines.

It is an object of this invention to provide a potato-carrying and unloading device adapted to be mounted upon the wheeled frame of a vehicle.

It is a further object of the invention to provide a potato-handling device comprising a box mounted on a vehicle into which the potatoes are loaded, said box having a bottom formed of a series of transversely extending planks, together with an endless conveyor which is moved longitudinally of the box beneath and adjacent said planks and which carries the potatoes from said box through an opening in the front thereof, said planks being individually removable endwise so that they can be successively removed from the discharge end of said box as the potatoes therein are discharged.

It is still further an object of this invention to provide a device adapted to be carried upon the frame of a vehicle, said device comprising a second frame including longitudinally extending laterally spaced members and transversely extending longitudinally spaced members supported thereby, said second frame having shafts mounted adjacent the ends thereof, said shafts each having laterally spaced sprockets thereon, an endless conveyor of openwork formation carried by said sprockets having a top run movable longitudinally in a substantially horizontal plane, said second frame having a series of transversely extending planks carried on some of said transversely extending members, said planks being disposed immediately above said top run of said conveyor, a box having side and end walls extending upwardly from said planks, said planks forming the bottom of said box, said conveyor extending beyond one end wall of said box and said planks being individually removable endwise whereby they can be successively removed from said end wall as the material is discharged from said box by said conveyor.

It is also an object of the invention to provide such a device as set forth in the preceding paragraph, said end wall having a portion above said conveyor which is movable toward and from said conveyor to form an opening for the discharge of said material.

It is another object of the invention to provide such a device as set forth in the preceding paragraph save one, said second frame having mounted thereon a plurality of rollers for supporting the top and bottom runs of said conveyor at each side thereof, said side walls of said box having their lower portions inclining inwardly and downwardly.

These and other objects and advantages of the invention will be fully set forth in the following description made in connection with the accompanying drawings in which like reference characters refer to similar parts throughout the several views and in which:

Fig. 1 is a view in side elevation of the device;
Fig. 2 is a top plan view of the device;
Fig. 3 is a view in front elevation; and
Fig. 4 is a vertical section taken substantially on line 4—4 of Fig. 1, as indicated by the arrows.

Referring to the drawings, a vehicle is shown having longitudinally extending frame members 10 which are connected at their ends by transversely extending frame members 11 thus forming a rectangular frame. Said frame is supported upon springs 12 which in turn are supported upon and secured to an axle 13 equipped with wheels 14 at its ends. Said wheels are shown as equipped with pneumatic tires. Said vehicle will of course have a front axle not shown on which the frame formed by members 10 and 11 are supported. A portion of a driver's cab 14 is shown.

In accordance with the present invention a second frame is provided which comprises longitudinally extending transversely spaced members 16, and while these members could be variously formed, they are shown as 4 x 4 timbers. Transversely extending bars 17 are provided which are spaced longitudinally of the device and these bars together with the members 16 are shown as secured to frame members 11 of the vehicle by headed and nutted bolts 18. While members 17 could be variously formed, in the embodiment of the invention illustrated they are shown as made of steel channels. A pair of channel members 20 are provided which extend longitudinally and are supported on bars 17, said members 20 being much closer together than members 16. A plurality of vertically extending bars 22 are provided and these are secured to the end portions of bars 17 in any suitable manner, as by welding. A plurality of bars 23 are also provided which extend transversely of and are supported upon the channels 20. Some of these bars designated 23a extend quite a distance to one side of one channel 20 and substantially to the outer sides of the vertical members 22. Others of the bars 23 are of shorter length and terminate some distance inwardly of vertical bars 22. A bar 24 illustrated as in the form of an angle bar extends longitudinally of and above bars 23, the same being supported on said bars. Bar 24 will preferably be secured to some of the bars 23 in any suitable manner, as by welding. Another bar 25 also illustrated as an angle bar extends longitudinally beneath the bars 23 adjacent bar 24 and engages vertical bars 29 which extend from two or more of the bars 17 to the bars 23. Bar 25 will be secured to bars 29 and to certain of the bars 23. The bars 23 are illustrated as of inverted T-shape, thus having the vertical flange extending upwardly from the center of the horizontal flange. A series of planks or boards 26 are provided and these respectively fit between the vertical flanges of members 23 and are supported upon the horizontal flanges thereof. Said planks extend some distance beyond the channel 20 shown at the right of Fig. 4, and also extend a longer distance to the left of the channel 20 shown in said figure. The planks 26 are thus arranged so that they can be individually removed endwise. Planks 26 are provided with upwardly extending pins or bolts 26a which will engage the sides of bar 24 when the planks are correctly in position.

The planks 26 form the bottom of a box 27 having side walls 27a and end walls 27b. The side walls 27a at their upper portions are secured to the vertical members 22 in any suitable manner, as by bolts or rivets 28. Bars 30 extend from the vertical bars 22 and at one side thereof downwardly to substantially the top of the planks 26. The lower end of bars 30 are secured to plates 31 which form extensions of the vertical flanges of members 23. Portions 27c of the side walls 27a are secured to bars 30 and extend downwardly and inwardly from each side of the box substantially to the top of planks 26. The end walls 27b are secured to laterally spaced vertically extending bars 33 which are secured at their lower ends to channels 20. A pair of channels 34 are secured to one side of the bars 33 at the front end wall 27b and provide a guideway for a movable door or gate 36. Door or gate 36 has guide members 36a at its sides and has an angle bar 36b secured at its top and extending transversely thereacross. A cable 38 is secured to angle 36b and extends vertically and runs over a pulley 39 in a pulley block 40 secured by a bolt 42 to the upper part of front end wall 27b. The front end wall 27b will be cut away throughout the area of gate or door 36. The cable 38 extends through guide members or washers 43 secured to the vertically extending members 22 and over a pulley 45 carried in a bracket 46 secured to the side wall 27a adjacent the front end thereof. Cable 38 extends over a small pulley 47 carried in a bracket 48 secured to the front wall 27b and is provided with a handle 38a adapted to be grasped by the operator. At the front end cable 38 passes from pulley 45 through an apertured guide member 50 secured to one of the angle bars 33 to the pulley 39.

Brackets 52 are secured to the end portion of each channel 20 and have journaled therein shafts 53. Each shaft 53 has secured thereto a pair of spaced sprockets 54, and an endless conveyor 56 runs over these sprockets. Conveyor 56 is of openwork construction and while it could be variously formed, in the embodiment of the invention illustrated it is shown as composed of transversely extending spaced comparatively small rods 56a which have their end portions bent at right angles and formed as hooks 56b. The hooks 56b engage or hook over the adjacent rods so that an endless openwork structure is formed. As shown in Fig. 1, the channel members 20 and thus the conveyor 52 project some distance beyond the rear wall 27b of the box 27. The top run of conveyor 56 is supported upon a series of rollers 58 which are journaled upon studs 59 secured in the adjacent sides of channels 20. The lower run of the conveyor is supported upon a plurality of rollers 61 carried on studs 62 supported in plates or brackets 63 secured to certain of the channel members 17. One of the shafts 53, which one is at the rear end of the vehicle, has secured thereto a sprocket 66. A chain 67 runs over sprocket 66 and over another sprocket 70 secured to a shaft 71 also journaled in a bearing secured to one of the channels 20. Shaft 71 has secured thereto a pulley 73 over which runs a chain or belt 74 also running over a pulley 75 secured to a driving shaft 76. Shaft 76 is journaled in a bearing 77 secured to one of the channels 20 and is also journaled in a bearing 78 secured to a bar 80 extending longitudinally and supported on and secured to the channel 17. Shaft 76 will be driven from a suitable motor, not shown, mounted on a pair of the members 17. One of the bars 23 at the forward end of the device extends to one of the vertical members 22.

In operation the vehicle comprising frame members 10 and wheels 14 will be positioned alongside the potato harvester and the potatoes will be delivered into the box 27. The potatoes can now be transported in said vehicle to the place where they will be stored or other place where they are to be deposited. When the potatoes are placed in the box 27 the gate or door 36 is in its lower or closed position. When the potatoes are to be discharged the operator will pull upon handle 38a thus pulling upon cable 38 and moving the cable so that door 36 is raised a desired distance. The lower driving shaft 76 will now be operated and shafts 76 will be rotated and shaft 71 will be driven or rotated through belt 74 and pulleys 73 and 75. Shaft 53 at the rear end of conveyor 56 will be rotated through the gears 70, 67 and 66 so that the top run of conveyor 56 will be moved toward the rear end of box 27. The conveyor will carry the potatoes thereon from the box through the opening formed by door 36. After a certain amount of the potatoes have been discharged, the operator will remove the plank 26 nearest the gate 36. This will let more of the potatoes move down onto the conveyor. As the potatoes are discharged, the gate 36 can be raised a greater distance and the planks 26 will be successively removed from the rear end. The potatoes can thus drop onto conveyor 56 and will be carried out of the box 27. The top run of the conveyor extends throughout the length of the box 27 so that when the forwardmost plank 26 is removed, all of the potatoes will be carried from the box by the conveyor 56. The potatoes are thus easily and efficiently removed and there is very little pommeling or bruising of the potatoes in the discharge movement thereof.

From the above description it will be seen that I have provided a simple, very efficient and easily operated device for handling, transporting and discharging potatoes or other material. The device can be separately constructed and then placed upon the frame of the vehicle and secured thereto by suitable means, as by the bolts 18 illustrated. Should any dirt or other small foreign matter be loaded with the potatoes, the same will be discharged between the rods 56a forming the conveyor so that the same will not be deposited with the potatoes when they are discharged. The device is made from simple material which can be readily secured. The device has been amply demonstrated in actual practice, found to be very successful and efficient and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A vehicle box structure for a highway vehicle adapted to be supported upon a wheel-supported frame having in combination, a pair of spaced longitudinally extending members adapted to rest on said frame, a plurality of longitudinally spaced bars extending transversely of and supported on said members, a second pair of laterally spaced longitudinally extending members supported on said bars, a series of longitudinally spaced transversely extending flanged members having vertical and horizontal flanges supported upon said second pair of longitudinally spaced members and projecting at one side of one of said last mentioned members, a series of transversely extending planks or boards freely supported on said flanged members extending to and spaced by said vertical flanges, said planks or boards having a great width compared to the width of said flanges, which latter are of small width, an endless conveyor having a top run moving longitudinally below and closely adjacent the underside of said planks, shafts mounted at the ends of said second mentioned longitudinally extending members, laterally spaced sprockets carried by each of said shafts over which said conveyor runs, and a box having side and end walls extending upwardly from said planks, said planks being individually removable endwise whereby they can be successively removed from a side of said box and said planks constitute practically all of the bottom of said box.

2. A vehicle box structure for a highway vehicle adapted to be supported upon a wheel-supported frame having in combination, a second frame having longitudinally extending members supported on and secured to said frame, and a plurality of longitudinally spaced transversely extending bars supported on and secured to said last mentioned members, a pair of transversely spaced longitudinally extending channel members supported upon said transversely extending members, a series of longitudinally spaced transversely extending plank-supporting members supported by said channels and extending some distance at one side of one of said channels, a series of transversely extending planks individually and freely supported by said last mentioned members, a plurality of supporting rollers mounted on said channels, transversely extending shafts mounted upon said channels adjacent the ends thereof, sprockets carried by said shafts, an endless conveyor of openwork formation carried by said sprockets and having a top run moving substantially horizontally beneath and adjacent said planks and supported upon said rollers, a box having side and end walls carried by said second frame and extending upwardly from said planks, said planks forming the bottom of said box, said channels and conveyor extending longitudinally beyond one of said end walls, said end wall having a portion above said conveyor movable toward and from the same, said planks being individually removable endwise whereby they can be individually and successively removed from one side of said box as the material is discharged from said box by said conveyor.

3. A box structure adapted to be mounted on the frame of a highway vehicle, such as a truck or trailer, and constructed and arranged to transport and unload potatoes having in combination, a box having vertical side walls and walls sloping inwardly from said walls to the bottom of said box, said box having a comparatively wide opening between the lower ends of said latter walls, an endless traveling conveyor having a horizontal top run extending from end to end of said box below said opening, said top run being closely adjacent said opening, said conveyor constituting the lowest support for said potatoes, said conveyor being arranged to discharge said potatoes at the rear of said box, and a multiplicity of planks above said top run of said conveyor and below said opening and forming the bottom of said box, said planks being of much greater length than width and extending transversely of said box having one of their ends projecting laterally substantially to the plane of one of said vertical side walls, said planks being loosely and freely supported and being individually slidable and freely removable manually endwise by taking hold of their ends respectively so that the material in said box may be progressively discharged onto said conveyor, the interior of said box being unobstructed above said planks and adjacent said conveyor.

4. A box structure adapted to be mounted on the frame of a highway vehicle, such as a truck or trailer, and constructed and arranged to transport and unload potatoes having in combination, a box having vertical side walls and walls sloping inwardly from said walls to the bottom of said box, said box having a comparatively wide opening between the lower ends of said latter walls, an endless conveyor having a horizontal top run extending from end to end of said box below said opening, said top run being closely adjacent said opening, spaced supporting members extending longitudinally of said box, a multiplicity of transversely extending members supported on said first mentioned members and having upstanding plate-like portions, a multiplicity of planks disposed between said plate-like portions so that a continuous bottom is formed for said box, the interior of said box being unobstructed above said planks, said planks being of much greater length than width extending transversely of said box and having one of their ends projecting laterally substantially to the plane of one of said vertical side walls, said planks being loosely and freely supported and being individually slidable and freely removable manually endwise by taking hold of their ends respectively so that said potatoes in said box may be progressively discharged onto said conveyor, said box having an end wall and a gate slidable adjacent said end wall to adjacent the top of said conveyor, said conveyor delivering the potatoes through the opening formed by raising said gate.

EBEN D. DAHLMAN.

References Cited in the file of this patent

UNITED STATES PATENTS

| Number | Name | Date |
|---|---|---|
| 669,876 | Critchlow | Mar. 12, 1901 |
| 1,945,532 | Lima | Feb. 6, 1934 |
| 2,275,799 | Oklejas | Mar. 10, 1942 |
| 2,278,730 | Neuman | Apr. 7, 1942 |
| 2,284,853 | Wall | June 2, 1942 |
| 2,464,217 | Dillingham | Mar. 15, 1949 |
| 2,489,055 | Steinacher | Nov. 22, 1949 |
| 2,496,305 | Ortmeier | Feb. 7, 1950 |
| 2,517,151 | Weston | Aug. 1, 1950 |
| 2,520,291 | Wall | Aug. 29, 1950 |
| 2,521,727 | Kappen | Sept. 12, 1950 |
| 2,563,158 | Claffey | Aug. 7, 1951 |
| 2,589,988 | Bruno | Mar. 18, 1952 |